United States Patent
Ricks

(10) Patent No.: US 6,180,145 B1
(45) Date of Patent: Jan. 30, 2001

(54) PROCESS FOR PREPARING BAKED POTATO PRODUCT

(75) Inventor: John Ricks, Idaho Falls, ID (US)

(73) Assignee: T & M Potato, LLC, Idaho Falls, ID (US)

(*) Notice: Under 35 U.S.C. 154(b), the term of this patent shall be extended for 0 days.

(21) Appl. No.: 09/060,406

(22) Filed: Apr. 13, 1998

(51) Int. Cl.[7] ........................................ A23L 1/216
(52) U.S. Cl. ..................... 426/243; 426/506; 426/511; 426/523; 426/637
(58) Field of Search ........................... 426/243, 637, 426/506, 509, 510, 523, 511, 410

(56) References Cited

U.S. PATENT DOCUMENTS

| | | | |
|---|---|---|---|
| 2,130,533 | * | 9/1938 | Barton ............................ 426/523 X |
| 3,009,816 | * | 11/1961 | Hendel ............................ 426/506 X |
| 4,906,483 | * | 3/1990 | Klous ............................ 426/509 X |
| 5,221,548 | * | 6/1993 | Walton ............................ 426/523 |

FOREIGN PATENT DOCUMENTS

| | | | |
|---|---|---|---|
| 486136 | * | 7/1976 | (AU) ............................ 426/637 |
| 2197175 | * | 5/1988 | (GB) ............................ 426/523 |
| 3-133356 | * | 6/1991 | (JP) ............................ 426/506 |

* cited by examiner

Primary Examiner—Arthur L. Corbin
(74) Attorney, Agent, or Firm—Hopkins, Roden, Crockett, Hansen & Hoopes

(57) ABSTRACT

A process for preparing potatoes improves the shelf life of cooked potatoes and improves the appearance, taste, and texture of the potatoes. The potatoes first are washed. They are next perforated and then coated with an edible oil. The potatoes are cooked by heating the core to between about 195 and 200° F. and holding for about 15 minutes. The cooked potatoes are soaked in a solution to rehydrate the potato cells. The rehydrated potato has an extended shelf life with improved appearance, taste, and texture.

18 Claims, 1 Drawing Sheet

PROCESS FOR PREPARING BAKED POTATO PRODUCT

TECHNICAL FIELD

This invention relates in general to a process for preparing a potato and, more particularly, to cooking the potato and rehydrating the cooked potato.

BACKGROUND OF THE INVENTION

Value added and convenient food items such as prepared salad mixes, pre-cooked pasta mixes and pre-cooked meats are currently being introduced to the general public and food service at a fast pace. However, there have not been significant introductions of refrigerated or shelf stable pre-cooked potato products. Baked potatoes are a significant component of the American diet. It takes an average of between 45 minutes and an hour to cook a potato in a conventional oven or a convection oven to achieve a great tasting baked potato. Individual potatoes may be cooked faster in a microwave or steam oven. A single potato can be cooked in a microwave oven or a steam oven in 8 to 30 minutes depending on the size of each individual potato. However, potatoes cooked in a microwave oven or a steam oven do not have the same preferred dry fluffy texture and flavor of a baked potato.

SUMMARY OF THE INVENTION

According to principles of the present invention, a process for preparing potatoes improves the shelf life of cooked potatoes and improves the appearance, taste, and texture of the potatoes. Potatoes are cooked then rehydrated. The potatoes are cooked by heating the core to between about 195 and 200° F. and holding for about 15 minutes. The cooked potatoes are rehydrated by soaking in a solution.

According to further principles of the present invention, the potatoes are pierced before rehydrating. Piercing the potatoes improves rehydration time and effectiveness.

Other objects, advantages, and capabilities of the present invention will become more apparent as the description proceeds.

DETAILED DESCRIPTION OF THE INVENTION

Figure 1:
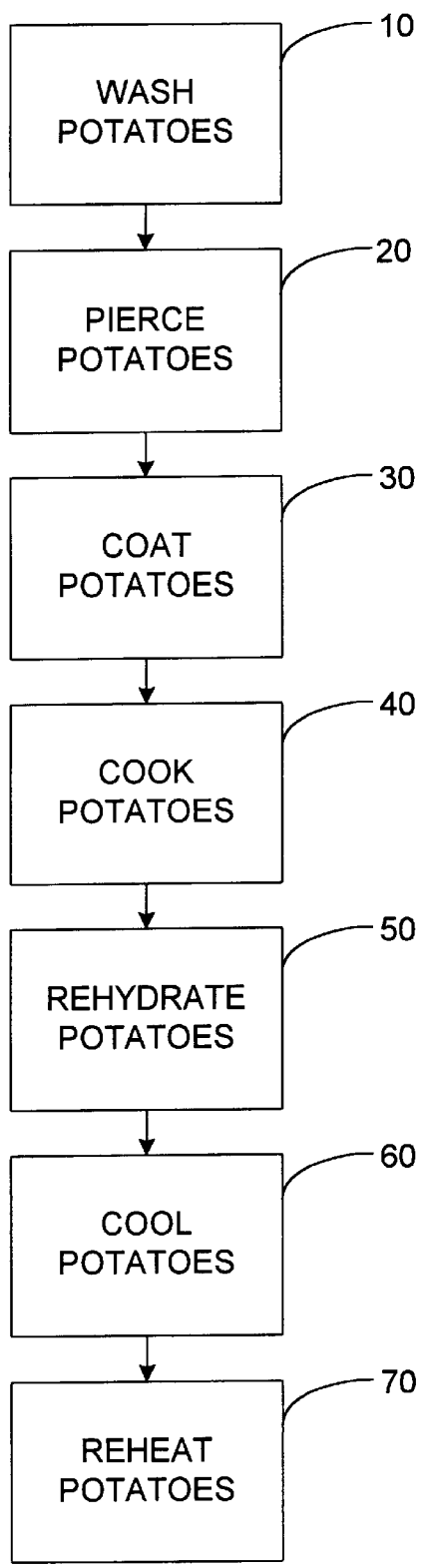
FIG. 1 is a flow chart showing a preferred embodiment of the process of the present invention.

FIG. 1 is a flow chart showing a preferred embodiment of the present invention. First, the potatoes are washed 10 with water and a soft bristled brush. Washing the potatoes removes all foreign material such as soil. Next the potatoes are pierced 20 to cause perforations in the potatoes. The perforations are spaced apart on the surface of the potatoes and extend entirely through the potatoes. The potatoes are pierced 20 between about 5 to about 50 times. Perforating 20 the potatoes allows moisture to easily and evenly escape during cooking. Alternatively, the potatoes are pierced 20 after cooking 40 and before rehydrating 50.

The perforated potatoes are next coated 30 with an edible oil. Dipping or rubbing the potato with an edible oil helps the potato skin or jacket retain moisture when exposed to high heat. The potato skin or jacket is more flexible after cooking when treated with an edible oil than it would be if untreated.

The coated potatoes are cooked 40. The potatoes are cooked by raising the core temperature of the potatoes to between about 195 and 200° F. Raising the core temperature of the potatoes is accomplished using any cooking process. For example, the potatoes may be steamed, baked, boiled, or microwaved. Additionally, any combination of cooking processes may be used to heat the potatoes.

The potatoes are cooked between about 200 degrees and about 450° F. Preferably, the potatoes are cooked between about 230 and about 260° F. in a convection oven. The preferred method yields potatoes having a more fluffy and mealy texture and a better color. Additionally, moisture is added to the hot air during cooking. The moisture helps keep the potato skin or jacket from dehydrating excessively during the cooking process.

Moisture is driven out of the potato during the cooking process. As a potato is heated from the outside to the center, the outside area just inside the skin or jacket tends to become more depleted of water than the rest of the potato. The cells in this area shrink causing the skin or jacket to have shriveled and unacceptable appearance when cooled. Piercing the potato enhances the appearance and more evenly distributes the loss of moisture from the potato. After cooking, the potatoes are rehydrated 50. The potatoes are rehydrated by soaking in water or exposing to steam. Alternatively, the potatoes are rehydrated with other soluble solutions. Preferably, the soluble solution contains a combination of some or all of the following: salt, potassium sorbate, citric acid, ascorbic acid and, sodium acid pyrophosphate. The potatoes may be rehydrated at any temperature below about 180° F. Temperatures higher than 180° F. tend to cook the potatoes more. Preferably, the potatoes are rehydrated at between 140 and 160 ° F. Rehydrating fills the cells of the potato so that the skin or jacket appearance is that of a potato that has not been dehydrated in the cooking process. The skin has the feel of a tight natural looking potato exterior. Potatoes which have been perforated before rehydrating have an unexpected improvement in the texture and flavor of the potato.

After rehydrating the potatoes, they are cooled 60. The potatoes are cooled to a temperature of between 32 degrees and 50 degrees before packaging.

The potatoes are packaged in a film bag, a tray over wrapped with film, or a box. Preferably, the potatoes are packages with a modified atmosphere to improve shelf life.

The potatoes are next reheated 70 for consumption. They are reheated 70 in a microwave oven. Alternatively, they are reheated 70 in conventional oven, a convection oven, or a steam oven. Potatoes cooked using the process of the present invention have an unexpected fluffy light texture and natural flavor after the potatoes has been reheated 70 in a microwave oven.

EXAMPLES

In each example one half of the potatoes were processed in accordance to the embodiments of the present invention the other half (control) were processed using normal cooking procedures.

EXAMPLE 1

Raw potatoes (Russet Burbank) were washed and one half were treated with an edible oil, the outer skin pierced with a sharp object, and all of the potatoes were placed in a 425° F. convection oven without the introduction of moisture. Potatoes were heated to a core temperature of 175° F. and held at that temperature for about 5 minutes. One half of the potatoes were dipped in an aqueous solution for about 10 minutes to rehydrate the outer skin. The other half (control) were not treated in an aqueous solution. After cooling, the skin appearance on the potatoes dipped in the aqueous solution was good, the control potatoes were shriveled. The control when reheated in the microwave had a lumpy and firm texture. The color was off white and the flavor was poor. The rehydrated potatoes when reheated in the microwave oven had a smoother texture and better flavor.

EXAMPLE 2

Raw potatoes (Russet Burbank) were washed and one half were treated with an edible oil, the outer skin pierced with a sharp object, and all of the potatoes were placed in a 350° F. convection oven. Potatoes were cooked to a core temperature of about 193 ° F. and held at that temperature for about 15 minutes. One half of the potatoes were then put in an aqueous solution for about 10 minutes the other half (control) was not rehydrated. After cooling, the outer skin of the potatoes dipped in the aqueous solution was very good in appearance. The control's appearance was very poor. The potatoes were microwaved for about 2 minutes. The texture was good except for the control which was poor, lumpy, and appeared solid. The color was poor. The flavor was good.

EXAMPLE 3

Raw potatoes (Russet Burbank) were washed and one half were treated with an edible oil, the outer skin pierced with a sharp object, and all of the potatoes were placed in a 225° F. convection oven. The potatoes were cooked to a core temperature of about 182° F. and held at that temperature for about 45 minutes. One half of the potatoes were then put in an aqueous solution for about 10 minutes the other half (control) was not rehydrated. After cooling, the outer skin appearance of the potatoes dipped in the aqueous solution was very good. The control was poor. Potatoes were then microwaved for about 2 minutes, the control texture was poor, lumpy, and solid in appearance. The rehydrated potatoes'texture was good. The color was good and the flavor good.

EXAMPLE 4

Raw potatoes (Russet Burbank) were washed and one half were treated with an edible oil, the outer skin pierced with a sharp object, and all of the potatoes were placed in a 250° F. convection oven. Potatoes were cooked to a core temperature of about 197° F. and held at that temperature for about 45 minutes. One half of the potatoes were then put in an aqueous solution for about 10 minutes the other half (control) was not rehydrated. After cooling, the outer skin appearance of the potatoes dipped in the aqueous solution was excellent. The control was poor. The potatoes were then microwaved for about 2 minutes. The control was lumpy. The texture of the rehydrated potatoes was light and fluffy and their appearance was excellent. The color was excellent and the flavor was excellent.

SUMMARY OF THE EXAMPLES

The following chart is a summary of the examples cited. The results have been rated numerically as follows: 1–2 (very poor), 3–5 (poor), 6–7 (good), 7–8 (very good), 9–10 (excellent)

| Sample Number | Oven Temperature | Core Temperature | Dwell Time | Microwave Time | Texture | Outer Skin Appearance | Color | Flavor |
|---|---|---|---|---|---|---|---|---|
| Sample #1 | 450° F. | 175° F. | 5 minutes | 2 minutes | 5 | 6 | 4 | 5 |
| Control #1 | 450° F. | 175° F. | 5 minutes | 2 minutes | 4 | 1 | 4 | 3 |
| Sample #2 | 350° F. | 193° F. | 15 minutes | 2 minutes | 6 | 7 | 6 | 6 |
| Control #2 | 350° F. | 193° F. | 15 minutes | 2 minutes | 2 | 2 | 5 | 3 |
| Sample #3 | 225° F. | 182° F. | 45 minutes | 2 minutes | 5 | 7 | 6 | 5 |
| Control #3 | 225° F. | 182° F. | 45 minutes | 2 minutes | 3 | 4 | 6 | 3 |
| Sample #4 | 250° F. | 197° F. | 45 minutes | 2 minutes | 10 | 9 | 9 | 10 |
| Control #4 | 250° F. | 197° F. | 45 minutes | 2 minutes | 5 | 3 | 7 | 3 |

Dwell time is the temperature the potatoes were held after the potatoes reached the core temperature in the preceding column.

What is claimed is:

1. A process for preparing a baked potato product comprising:
   providing a raw potato comprising a core and an exterior having an outer skin;
   washing the skin;
   following the washing step, cooking the potato to a temperature at the core of about 175° F. to 200° F. for at least about 15 minutes;
   following the cooking step, rehydrating the core and the skin by soaking the potato in a solution, or by exposing the potato to steam, at a temperature below about 180° F. and for at least about 10 minutes such that the skin is tight to the core and has an appearance and a texture resembling the exterior of the raw potato prior to the cooking step;
   following the rehydrating step, cooling the potato to a temperature of about 32° F. to about 50° F.; and
   packaging the potato.

2. The process of claim 1 wherein the cooking step is performed in a convection oven at a temperature of at least about 230° F. for at least about 45 minutes.

3. The process of claim 1 wherein the rehydrating step comprises soaking the potato in the solution and the solution is maintained at a temperature of from about 140° F. to 180° F.

4. The process of claim 1 wherein the rehydrating step comprises soaking the potato in the solution, and the solution comprises water and an additive selected from the group consisting of salt, potassium sorbate, citric acid, ascorbic acid, and sodium acid pyrophosphate.

5. The process of claim 1 wherein the cooking step comprises heating in an oven in hot air with added moisture.

6. The process of claim 1 further comprising at least partially piercing the core and the skin with a plurality of perforations prior to the rehydrating step.

7. The process of claim 1 further comprising coating the skin with an edible oil following the washing step but prior to the cooking step.

8. The process of claim 1 wherein the packaging step comprises a method selected from the group consisting of wrapping the potato in a film bag, placing the potato in a tray wrapped with a film, and placing the potato in a box.

9. A process for preparing a baked potato product comprising:
   providing a raw potato comprising a core and an exterior having an outer skin;
   washing the skin;
   following the washing step, cooking the potato in hot air having a temperature of at least about 230° F. for at least about 45 minutes;
   adding moisture to the hot air during the cooking step to prevent the skin from dehydrating;
   following the cooking step, rehydrating the core and the skin by soaking the potato in a solution such that the skin is tight to the core and has an appearance and a texture resembling the exterior of the raw potato prior to the cooking step;
   packaging the potato;
   cooling the potato to a temperature of about 32° F. to about 50° F.; and
   following the cooling step, reheating the potato.

10. The process of claim 9 wherein the solution comprises water, and an additive in the water selected from the group consisting of salt, potassium sorbate, citric acid, ascorbic acid, and sodium acid pyrophosphate.

11. The process of claim 9 wherein the packaging step comprises a method selected from the group consisting of wrapping the potato in a film bag, placing the potato in a tray wrapped with a film, and placing the potato in a box.

12. The process of claim 9 further comprising coating the skin with an edible oil following the washing step but prior to the cooking step.

13. The process of claim 9 further comprising at least partially piercing the core and the skin with a plurality of perforations prior to the rehydrating step.

14. A process for preparing a baked potato product comprising:
   providing a raw potato comprising a core and an exterior having an outer skin;
   washing the skin;
   following the washing step, cooking the potato to a temperature at the core of about 195° F. to 200° F. for at least about 15 minutes;
   following the cooking step, rehydrating the core and the skin by soaking the potato for at least ten minutes in a solution comprising water at a temperature of about 140° F. to 180° F., and an additive in the water selected from the group consisting of salt, potassium sorbate, citric acid, ascorbic acid, and sodium acid pyrophosphate, such that the skin is tight to the core and has an appearance and a texture resembling the exterior of the raw potato prior to the cooking step;
   packaging the potato;
   cooling the potato to a temperature of about 32° F. to about 50° F.; and
   microwaving the potato.

15. The process of claim 14 further comprising at least partially piercing the skin and the core with a plurality of perforations prior to the rehydrating step.

16. The process of claim 14 further comprising coating the skin with an edible oil following the washing step but prior to the cooking step.

17. The process of claim 14 wherein the cooking step is performed in a convection oven at a temperature of about 230° F. to 260° F.

18. The process of claim 14 wherein the cooking step is performed with hot air having added moisture at a temperature of about 230° F. to 260° F.

* * * * *